United States Patent
Gokturk

(12) 
(10) Patent No.: US 6,548,971 B2
(45) Date of Patent: Apr. 15, 2003

(54) DUAL SIDED SELF-OSCILLATION CIRCUIT FOR DRIVING AN OSCILLATORY ACTUATOR

(75) Inventor: Halit S. Gokturk, Mountain View, CA (US)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/862,862

(22) Filed: May 22, 2001

(65) Prior Publication Data

US 2002/0175643 A1 Nov. 28, 2002

(51) Int. Cl.[7] .................. H02K 33/02; B26B 19/28
(52) U.S. Cl. .................. 318/114; 318/129; 318/130; 318/128
(58) Field of Search .................. 310/36; 318/114, 318/119, 126, 127, 128, 129, 130, 135; 30/43.7, 43.8, 43.9, 43.91, 43.92

(56) References Cited

U.S. PATENT DOCUMENTS

| | | | |
|---|---|---|---|
| 4,331,263 A | 5/1982 | Brown | 222/63 |
| 4,683,413 A * | 7/1987 | Bax | 318/779 |
| 5,548,197 A * | 8/1996 | Unsworth et al. | 318/757 |
| 5,632,087 A | 5/1997 | Motohashi et al. | 30/43 |
| 5,914,849 A | 6/1999 | Perreira | 361/187 |
| 6,133,701 A | 10/2000 | Gokturk et al. | 318/114 |

FOREIGN PATENT DOCUMENTS

| | | |
|---|---|---|
| JP | 63-314191 | 12/1988 |
| WO | WO 00/16482 | 3/2000 |

* cited by examiner

*Primary Examiner*—Nestor Ramirez
*Assistant Examiner*—Judson H. Jones
(74) *Attorney, Agent, or Firm*—Muramatsu & Associates

(57) ABSTRACT

A dual sided self-oscillation circuit for driving an oscillatory actuator with high efficiency and high response speed. The actuator has a winding to receive a periodical supply current from a power source and oscillates in a predetermined resonant frequency. The self-oscillation circuit includes a bandpass filter for receiving a back electromotive force voltage (Vbemf) developed across the winding and producing a sine wave output signal, a comparator for comparing the sine wave output signal with a threshold voltage and producing two drive pulses per cycle of the resonant frequency, and a switch connected in series with the winding to connect or disconnect the power source to the winding in response to the drive pulses, thereby flowing electric current in two directions at each cycle.

20 Claims, 13 Drawing Sheets

(a)

(b)

DUAL SIDED SELF-OSCILLATION CIRCUIT FOR DRIVING AN OSCILLATORY ACTUATOR

FIELD OF THE INVENTION

This Invention relates to a self-oscillation circuit for driving an oscillatory actuator, and more particularly to a dual sided self-oscillation circuit for driving a linear or rotational oscillatory actuator which causes drive current in two directions in the actuator within a resonant cycle of the actuator for improving performances and controllability of the actuator.

BACKGROUND OF THE INVENTION

A linear oscillatory actuator has been utilized in many electrical devices such as a reciprocatory shaver, and normally comprises a stator carrying a winding and a reciprocator carrying a permanent magnet. The winding is connected to receive a periodical electric current from a power source to generate a magnetic flux which interacts with the permanent magnet to cause a mechanical resonance of the reciprocator around its natural frequency, thereby forcing the reciprocator to move linearly relative to the stator. This invention is directed to a self-oscillation circuit for driving a linear oscillatory actuator or other types of actuator such as a rotational oscillatory actuator. Although a reciprocator is part of an actuator, within the context of this invention, the terms "actuator" and "reciprocator" may interchangeably be used.

U.S. Pat. No. 6,133,701 discloses a system for driving the linear oscillatory actuator with a self-oscillation circuit, one of circuit diagrams therein is shown in FIG. 1. The circuit is connected to receive a back electromotive force voltage signal developed across the winding (actuator coil) in a positive feedback manner to generate a drive pulse. The electric current generated by the drive pulse is periodically supplied to the winding for continuing the mechanical resonance of the reciprocator. With this scheme, however, the reciprocator is difficult to keep the consistent oscillation without being considerably damped when subjected to a heavy load.

Further, in the prior art example shown in FIG. 1, various performances of the circuit such as power control, self start oscillation and etc. are not sufficient for next generation circuit design. The present invention has been accomplished in view of the above background to provide an improved self-oscillation circuit for driving a linear or rotational oscillatory actuator around its resonant frequency.

SUMMARY OF THE INVENTION

It is, therefore, an object of the present invention to provide a dual sided self-oscillation circuit for driving an oscillatory actuator which is able to generate two drive pulses to cause electric current flowing in positive and negative directions in the actuator per resonant cycle of the actuator.

It is another object of the present invention to provide a dual sided self-oscillation circuit for driving an oscillatory actuator for improving the performance of the actuator such as reduction of power consumption and increase in response speed.

In the present invention, the self-oscillation circuit for driving an oscillatory actuator which has a winding to receive a periodical supply current from a power source and oscillates in a predetermined resonant frequency, includes a bandpass filter whose center frequency is adjusted to the resonant frequency for receiving a back electromotive force voltage (Vbemf) developed across the winding in the actuator and producing a sine wave output signal representing the Vbemf, and a power amplifier for receiving the sine wave output signal from the bandpass filter and producing two drive pulses in each cycle of the resonant frequency of the actuator to cause the periodical supply current flowing in positive and negative directions through the winding.

In another aspect of the present invention, the power amplifier is realized by a comparator for comparing the sine wave output signal from the bandpass filter with a threshold voltage and producing the drive pulse when the sine wave exceeds the threshold voltage, and a switch connected in series with the winding to connect or disconnect the power source to the winding in response to the drive pulse, thereby causing the periodic supply current flowing in positive and negative directions through the winding.

In a more particular implementation of the present invention, the self-oscillation circuit is configured with a bandpass filter whose center frequency is adjusted to the resonant frequency for receiving a back electromotive force voltage (Vbemf) developed across the winding in the actuator and producing a sine wave output signal representing the Vbemf, a first comparator for comparing the sine wave output signal from the bandpass filter with a threshold voltage and producing a first drive pulse when the sine wave exceeds the threshold voltage in a first half cycle of the resonant frequency, a second comparator for comparing a sine wave which is inverted in polarity from the sine wave output signal from the bandpass filter with the threshold voltage and producing a second drive pulse when the sine wave exceeds the threshold voltage in a second half cycle of the resonant frequency, and an H-bridge switch circuit having four switches with the actuator connected in a middle portion thereof and connected to the power source. The H-bridge switch circuit connects or disconnects the power source to the winding in response to the first and second drive pulses, thereby causing the periodic supply current flowing in the positive and negative directions through the winding.

Preferably, the threshold voltage of the first and second comparators is different from a bias voltage of the bandpass filter to produce the drive pulses with duty ratio less than 50—50. The self-oscillation circuit additionally includes means for instantaneously changing the threshold voltage of the first and second comparators to be the same as the bias voltage of the bandpass filter at a start-up process of oscillation of the actuator.

In a further aspect, the self-oscillation circuit is comprised of a bandpass filter whose center frequency is adjusted to the resonant frequency for receiving a back electromotive force voltage (Vbemf) developed across the winding in the actuator and producing a sine wave output signal representing the Vbemf, a comparator for comparing the sine wave output signal from the bandpass filter with a threshold voltage and producing a drive pulse with a positive voltage swing in a first half cycle of the resonant frequency and with a negative voltage swing in a second half cycle of the resonant frequency produced every time when the sine wave crossing the threshold voltage, and a push-pull switch circuit having two switches with the actuator connected in a middle portion thereof to a ground and connected to positive and negative power sources. The push-pull switch circuit connects or disconnects the positive and negative power sources to the winding in response to the drive pulse, thereby causing the periodic supply current flowing in the positive and negative directions through the winding.

In a further aspect, the self-oscillation circuit includes a bandpass filter whose center frequency is adjusted to the resonant frequency for receiving a back electromotive force voltage (Vbemf) developed across the winding in the actuator and producing a sine wave output signal representing the Vbemf, a first comparator for comparing the sine wave output signal from the bandpass filter with a first threshold voltage and producing a first drive pulse when the sine wave exceeds the first threshold voltage in a first half cycle of the resonant frequency, a second comparator for comparing the sine wave output signal from the bandpass filter with a second threshold voltage and producing a second drive pulse when the sine wave exceeds the second threshold voltage in a second half cycle of the resonant frequency, and a push-pull switch circuit having two switches with the actuator connected in a middle portion thereof to a ground and connected to positive and negative power sources. The push-pull switch circuit connects or disconnects the positive and negative power sources to the winding in response to the first and second drive pulses, thereby causing the periodic supply current flowing in the positive and negative directions through the winding.

In the self-oscillation circuit of the present invention, the double sided drive method is used in which the drive pulse occurs two times per cycle of the mechanical resonance frequency for causing electric current in positive and negative directions in the actuator winding. This method requires a substantially smaller amount of electric power for driving the actuator than that required in the conventional technology. Further, the double sided drive method of the present invention introduces other benefits such as quick response to external loads, because the repetition rate of the drive pulse is two times higher than that of the single sided drive method.

These and still other objects and advantageous features of the present invention will become more apparent from the following description of the preferred embodiments when taken in conjunction with the attached drawings.

DETAILED DESCRIPTION OF THE PREFERRED EMBODIMENTS

Figure 1:
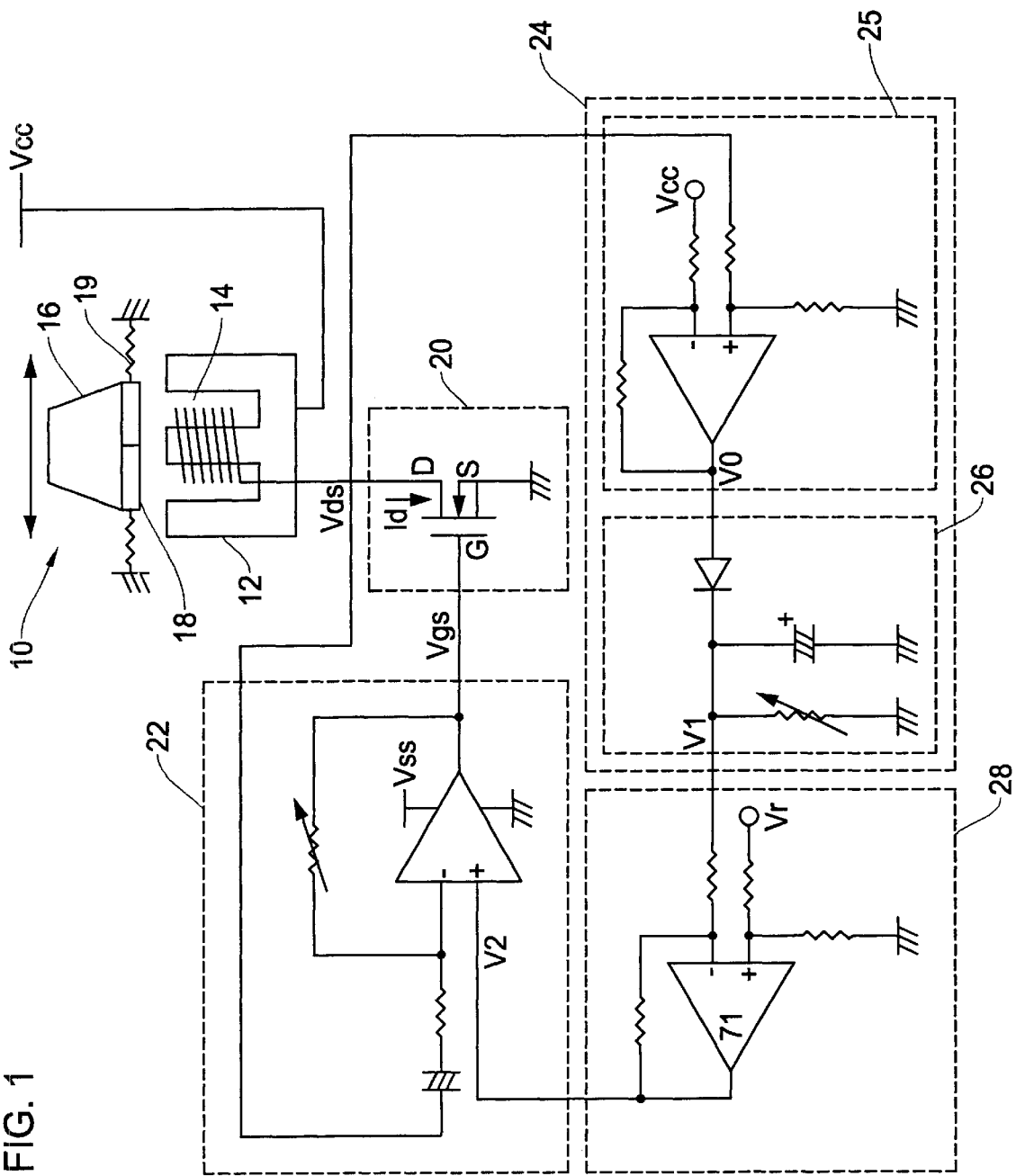
FIG. 1 is a circuit diagram showing a conventional self-oscillation circuit for driving a linear oscillatory actuator which is described in U.S. Pat. No. 6,133,701.
Figure 2A:
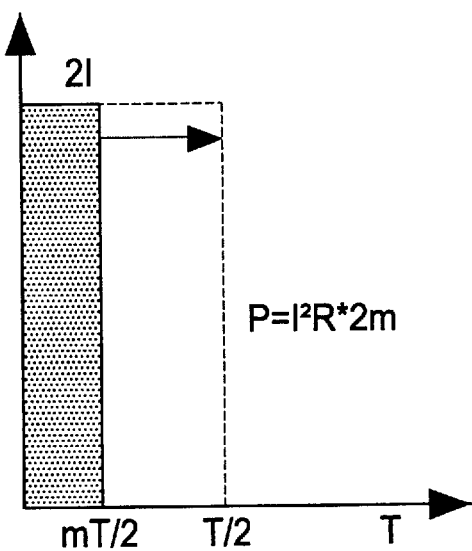
FIGS. 2A and 2B are schematic diagrams showing a difference between a single sided drive method and a double sided drive method in a self-oscillation circuit.
Figure 2B:
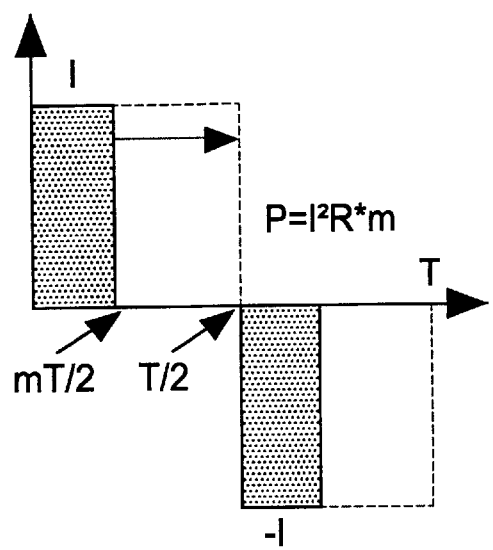
Figure 3:
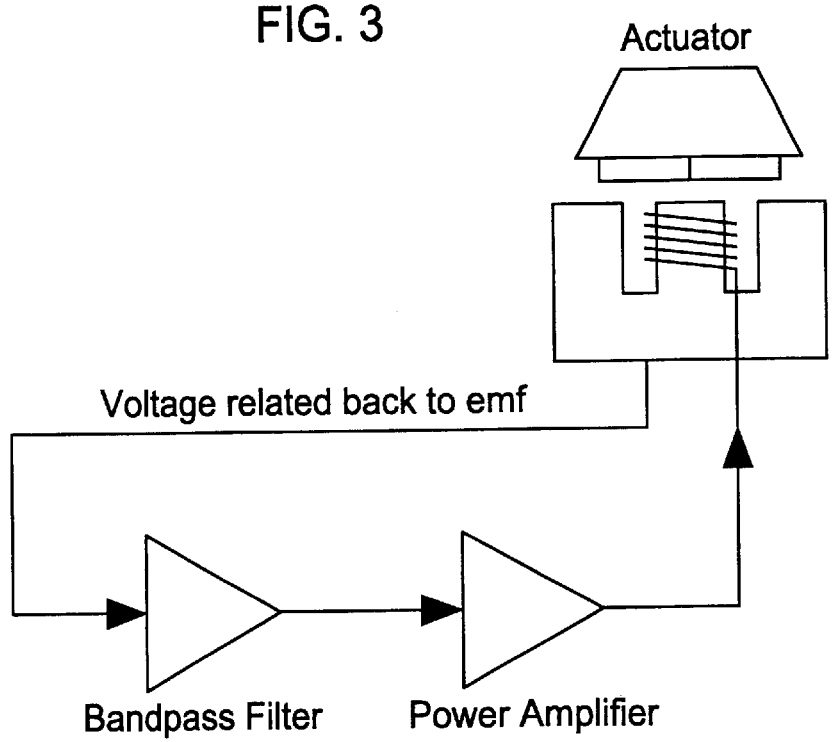
FIG. 3 is a schematic diagram showing a basic circuit structure of a self-oscillation circuit for driving a linear oscillatory actuator configured with a bandpass filter and an amplifier in accordance with the present invention.

Referring now to FIGS. 2 and 3, there is shown a basic concept of a self-oscillation circuit for driving an oscillatory actuator in accordance with the present invention. The present invention is described in a case for driving a linear oscillatory actuator for an illustration purpose. However, it should be noted that the present invention is also applicable to other types of actuator such as rotational oscillatory actuator.

The self-oscillation circuit is connected to receive a back electromotive force voltage (Vbemf) appearing across the winding in the actuator in a positive feedback manner to generate a drive pulse which is supplied to the actuator. The drive pulse causes the electric current to be periodically supplied to the winding in both plus and minus directions for continuing the oscillation of the actuator (reciprocator). The oscillation frequency of the actuator is a mechanical resonance frequency or natural frequency of the reciprocator.

In the self-oscillation circuit of the present invention, it is designed that the drive pulse occurs two times per cycle of the mechanical resonance frequency to flow electric current in the actuator winding in two (positive and negative) directions, i.e., a double sided drive method. In contrast, the self-oscillation circuit in the conventional technology generates one drive pulse per resonant cycle to flow electric current in the actuator winding in one direction, i.e., a single sided drive method.

FIGS. 2A and 2B show the difference between the single sided drive method and double sided drive method in the self-oscillation circuit. FIG. 2A illustrates a waveform of the single sided drive in the conventional technology in which a drive pulse with a current amplitude 2I excites the actuator in a resonant cycle T of the actuator. FIG. 2B illustrate a waveform of the double sided drive of the present invention where two drive pulses with opposite polarities each having a current amplitude I excites the actuator during the resonant cycle T.

In FIGS. 2A and 2B, depending on the amount of power needs to maintain the reciprocal movement of the actuator, a pulse width will be regulated by the positive feedback loop of the self-oscillation circuit. In other words, pulse width modulation is performed in the circuit with a degree of modulation or modulation factor m ($0 \leq m \leq 1$). Suppose R denotes overall resistance in the path flowing the electric current I or 2I above, overall power consumption P in the single sided drive is expressed as $P=I^2R \cdot 2m$ while overall power consumption P in the double sided drive is expressed as $P=I^2R \cdot m$. This relationship dictates that the single sided drive has twice as much power loss as that of the double sided drive.

Therefore, the double sided drive in the present invention requires a substantially smaller amount of electric power for driving the actuator. Since the linear oscillatory actuator is applied to electrical devices such as a reciprocatory shaver which is battery operated, the reduction of power achieves a significant advantage. Further, the double sided drive method introduces other benefits including quick response to external loads, because the repetition rate of the drive pulse is two times higher than that of the single sided drive method.

To establish the double sided drive, the basic configuration of the self-oscillation circuit is composed of a bandpass filter and a power amplifier as shown in FIG. 3. The center frequency (pass band frequency) of the bandpass filter is set to the mechanical resonant frequency of the reciprocator. The input of the bandpass filter is biased with a predetermined voltage such as a ground potential and is provided with a feedback voltage which represents the back electromotive force voltage (Vbemf) detected at the winding of the actuator. Thus, the output of the bandpass filter is a sine wave signal with a positive curve in the first half cycle and a negative curve in the last half cycle. The power amplifier receives the sine wave signal from the bandpass filter and generates drive pulses with positive and negative directions such as shown in FIG. 2B.

Figure 4:
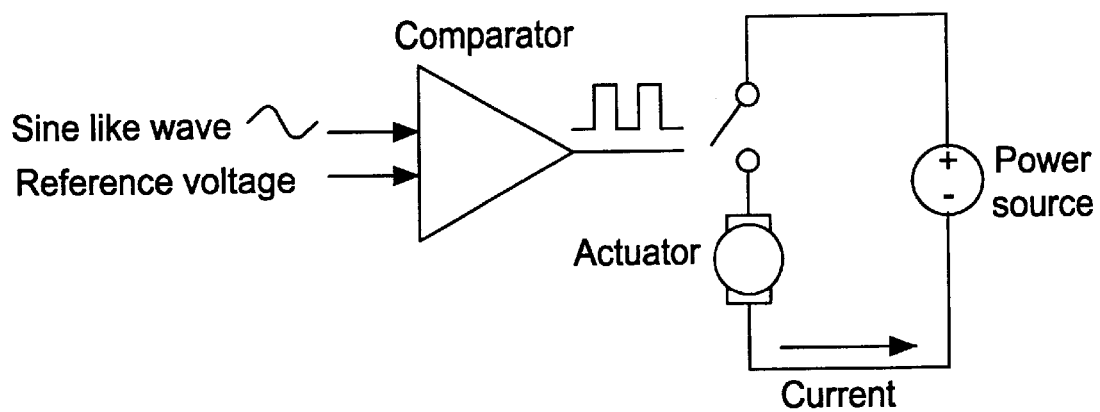
FIG. 4 is a schematic diagram showing a self-oscillation circuit incorporating a comparator and a switch as a power amplifier of FIG. 3.
Figure 5:
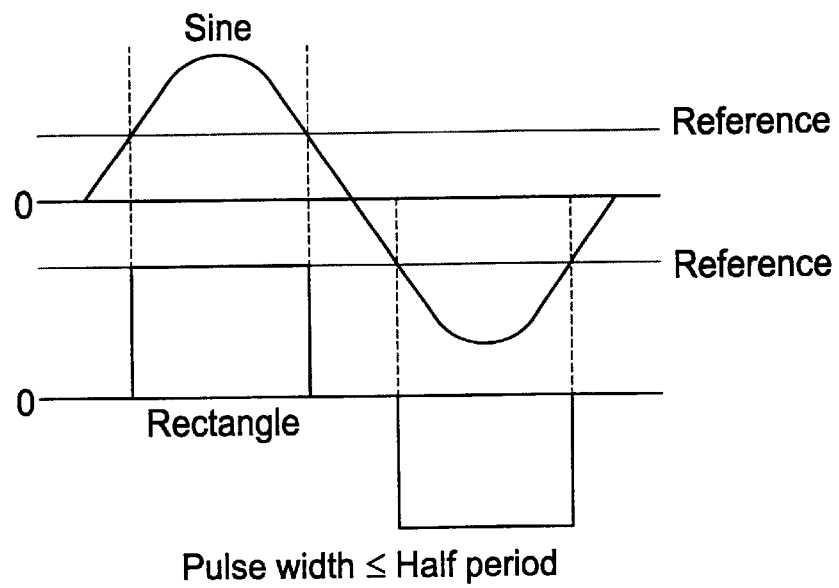
FIG. 5 is a waveform chart showing input and output waveforms of the comparator in the self-oscillation circuit of FIG. 4.

The power amplifier of FIG. 3 is realized by, for example, a comparator and a switch as shown in FIG. 4. The waveforms at the input and output of the comparator are shown in FIG. 5. The comparator receives the sine wave signal at its one input and a threshold voltage (reference voltage) at its another input. Thus, the input sine wave is wave-shaped to a rectangular wave (drive pulse) which serves as a control signal for the switch provided between the power source and the winding. As shown in FIG. 5, the threshold voltage determines a reference point of the input sine wave at which the output of the comparator changes its state. Therefore, the threshold voltage to the comparator determines a pulse width, i.e., a duty ratio of the drive pulse.

Figure 6:
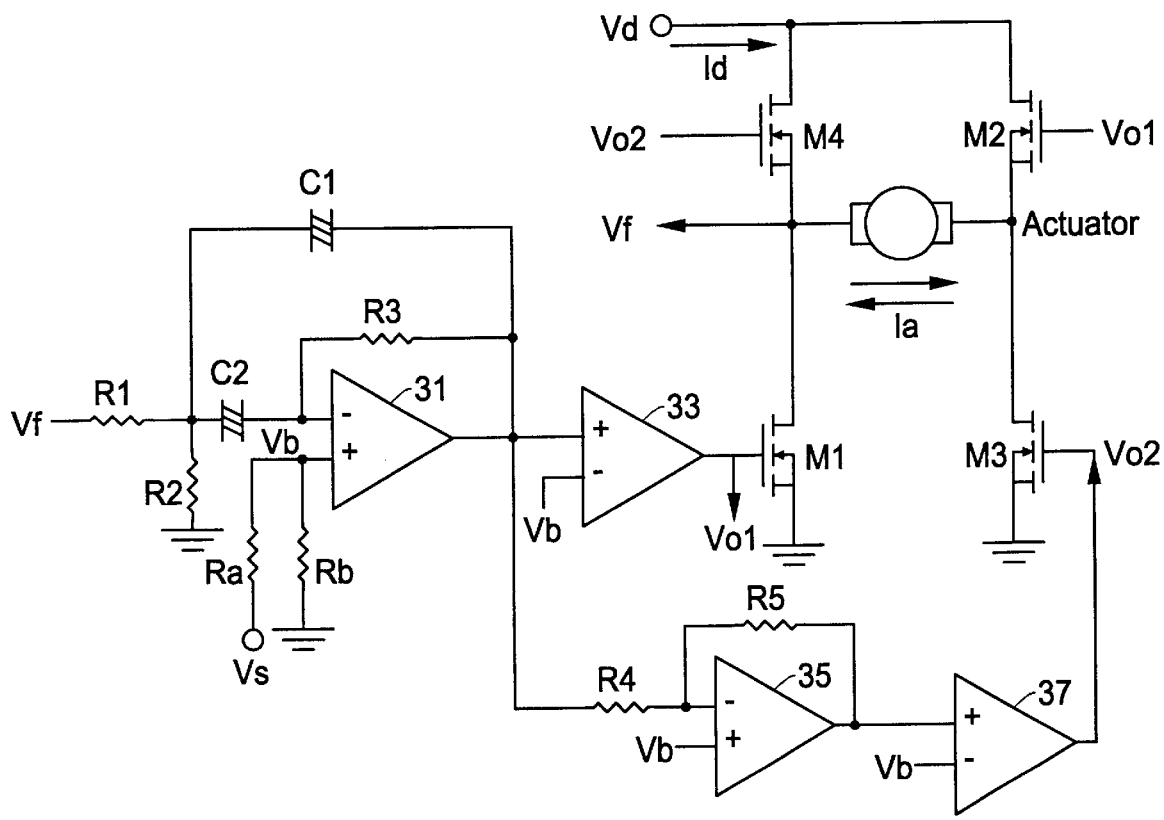
FIG. 6 is a circuit diagram showing an example of structure in the self-oscillation circuit for driving a linear oscillatory actuator with an H-bridge circuit and one bias voltage configuration in the present invention.

The first preferred embodiment is shown in FIG. 6 which is a self-oscillation circuit for driving a linear oscillatory actuator with an H-bridge circuit configuration. This example is provided with one bias voltage Vb for the bandpass filter and the comparators. Four switches and the actuator are connected to form an H-bridge circuit which is connected to a voltage source Vd to introduce a supply current to the actuator. The actuator (reciprocator) with the winding is connected at the middle section of the H-bridge circuit. In this example, the four switches are implemented by metal oxide semiconductor field effect transistors (MOSFET) M1–M4, although other type of switches can also be used.

The bandpass filter is configured with an operational amplifier 31, resistors R1, R2, R3, Ra and Rb, and capacitors C1 and C2. Such an active bandpass filter is known in the art, thus, no specific explanation regarding the bandpass filter is given here. The example of FIG. 6 includes a pair of comparators 33 and 37 each being formed with an operational amplifier. The comparator 33 receives the output of the amplifier 31 in the bandpass filter and the comparator 37 receives an inverted output of the amplifier 31 through an inverter formed with an operation amplifier 35 and resistors R4 and R5.

The output (drive pulse) Vo1 of the comparator 33 has a rectangular waveform such as shown in FIG. 5 and is supplied to the gates of the MOSFETs M1 and M2. Similarly, the output (drive pulse) Vo2 of the comparator 37 has a rectangular waveform and is supplied to the gates of the MOSFETs M3 and M4. A feedback voltage Vf representing the back electromotive force voltage (Vbemf) across the winding is detected and supplied to the input of the bandpass filter, thereby forming a positive feedback loop. The bandpass filter is provided with the bias voltage Vb at the non-inverting input of the operational amplifier 31.

The comparators 33 and 37 are provided with the same threshold voltage (bias voltage) Vb which is the same voltage as the bias voltage Vb supplied to the bandpass filter. Thus, each of the comparators 33 and 37 compares the input signal with the threshold voltage Vb. When the input signal level exceeds the threshold voltage Vb, the output of the comparator changes from one voltage level to another voltage level, thereby creating the drive pulses Vo1 and Vo2 of rectangular waveform noted above.

Figure 8A:
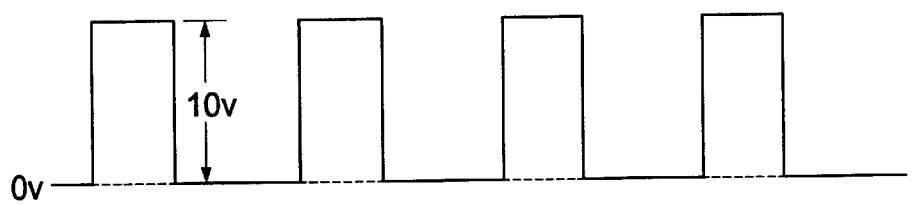
FIGS. 8A–8D are waveform charts illustrating rectangular drive pulses, supply current from a power source, and displacement of the actuator involved in the operation of the embodiments of FIGS. 6 and 7.
Figure 8B:
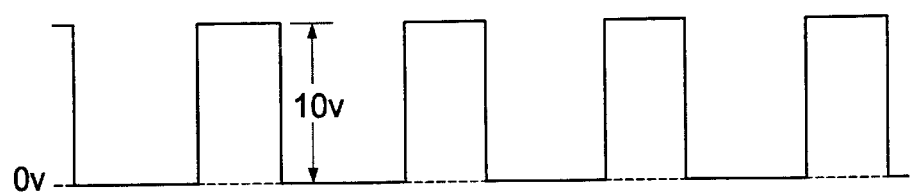

Since the comparator 37 receives the inverted output signal of the bandpass filter through the inverter, the drive pulses Vo1 and Vo2 are phase shifted with one another by 180° as shown in FIGS. 8A and 8B. Further, since the threshold voltage Vb for the two comparators 33 and 37 is the same, and thus changes the output states at the same input voltage, the drive pulses Vo1 and Vo2 have a 50—50 duty ratio. Since the drive pulses Vo1 and Vo2 are applied to the MOSFET switches M1–M4, the supply current Id flows through the switch M2, actuator, and switch M1 in the first half cycle of the resonant frequency, and through the switch M4, actuator, and switch M3 in second half cycle. Consequently, the self-oscillation circuit of the present invention drives the actuator by electric current Ia in two directions (double sided drive) caused by two drive pulses for each cycle of the resonant frequency.

Figure 7:
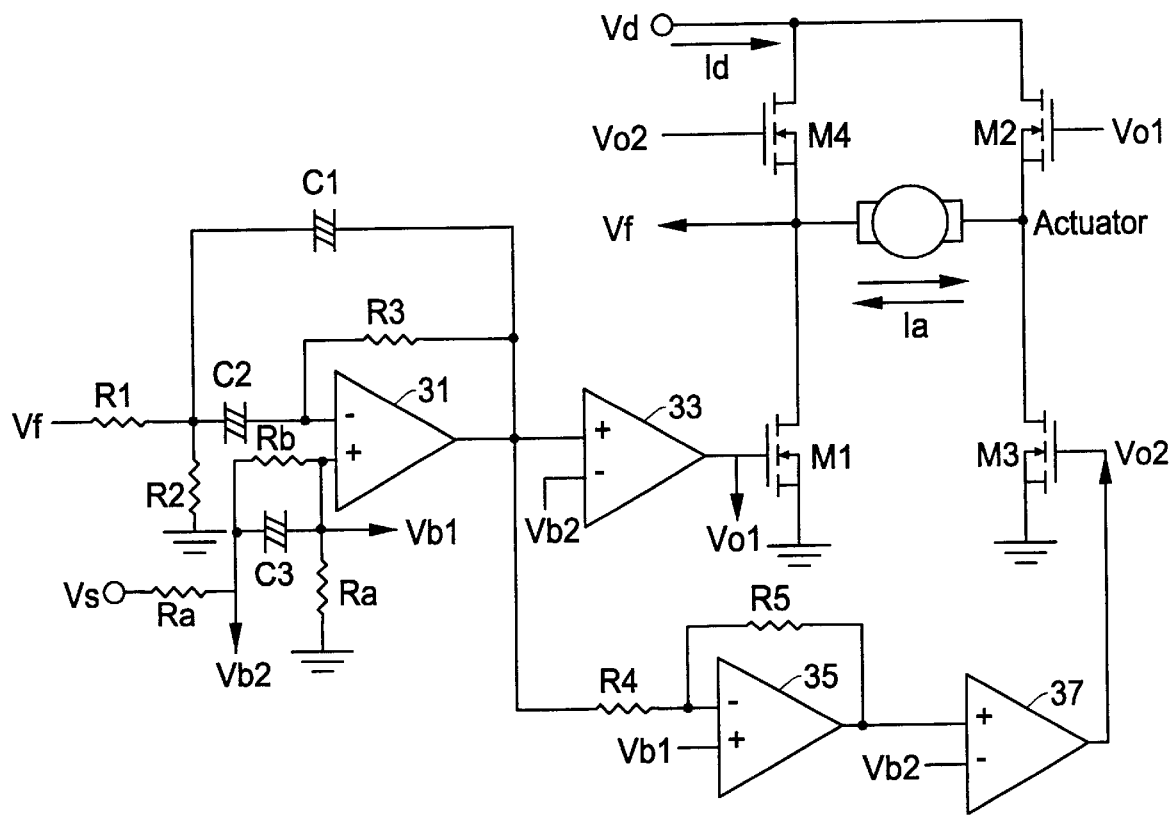
FIG. 7 is a circuit diagram showing another example of structure in the self-oscillation circuit for driving a linear oscillatory actuator with an H-bridge circuit and two bias voltage configuration in the present invention.

Another preferred embodiment is shown in FIG. 7 which is a self-oscillation circuit for driving a linear oscillatory actuator with the H-bridge similar to the embodiment of FIG. 6. The example of FIG. 7 includes two bias voltages Vb1 and Vb2. The bias voltage Vb1 is provided to the bandpass filter (operational amplifier 31) and the inverter (operational amplifier 35). The bias voltage Vb2 is provided to the comparators 33 and 37, respectively, as a threshold voltage.

Thus, depending on the amount of difference between the bias voltage Vb1 and the threshold voltage Vb2, the duty ratio in the drive pulses Vo1 and Vo2 will be adjusted to less than 50—50, for example, 40—40. In FIG. 7, such adjustment can be made by changing resistance Ra and/or Rb. When the duty ratio is 50—50 as in the example of FIG. 6, the self-oscillation circuit is able to produce the drive pulses Vo1 and Vo2 even when the output sine wave of the bandpass filter is small. In contrast, the example of FIG. 7 requires the output sine wave having an amplitude larger than the voltage difference between the bias voltages Vb1 and Vb2 to produce the drive pulses for the actuator. However, the example of FIG. 7 has a better controllability for attaining optimum performance of the actuator by selecting the bias voltages as well as other parameters.

The example of FIG. 7 further includes a resistor network, i.e., a voltage divider, formed of resistors Ra and Rb where capacitor C3 is connected across the resistor Rb. The voltage divider determines the bias voltages Vb1 and Vb2. The purpose of this arrangement is to facilitate a start-up operation in the self-oscillation circuit for driving the actuator. As noted above, when two bias voltages Vb1 and Vb2 are used in the embodiment of FIG. 7, the output voltage of the bandpass filter must be larger than the difference between the two voltages.

At the start-up of the self-oscillation circuit, it is necessary that the comparators 33 and 37 can produce drive pulses even when an output voltage of the bandpass filter, i.e., the back electromotive force voltage (Vbemf) is small. To facilitate such a start-up operation, the capacitor C3 is provided to instantaneously short circuit the resistor Rb, at power on, so that the two bias voltages Vb1 and Vb2 become the same or similar to one another, thereby increasing the voltage sensitivity of the comparators 33 and 37.

Figure 8C:
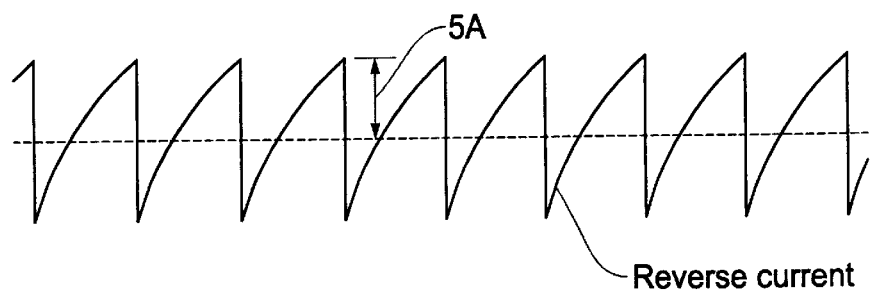
Figure 8D:
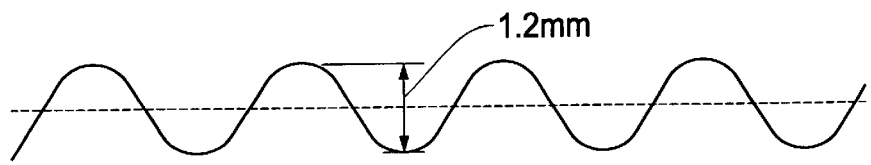

The waveform charts of FIGS. 8A–8D illustrate rectangular drive pulses, supply current from the power source, and displacement of the actuator involved in the operation of the embodiments of FIGS. 6 and 7. FIG. 8A shows a waveform of the drive pulse Vo1 and FIG. 8B shows a waveform of the drive pulse Vo2, which are phase shifted with one another by 180°. FIG. 8C shows a waveform of the supply current Id flowing from the power source Vd to the actuator. FIG. 8D is a waveform showing the displacement of the actuator (reciprocator) which is the oscillation amplitude of the actuator at the mechanical resonant frequency. In this example, the peak-to-peak oscillation amplitude is about 1.2 millimeters.

Figure 9:
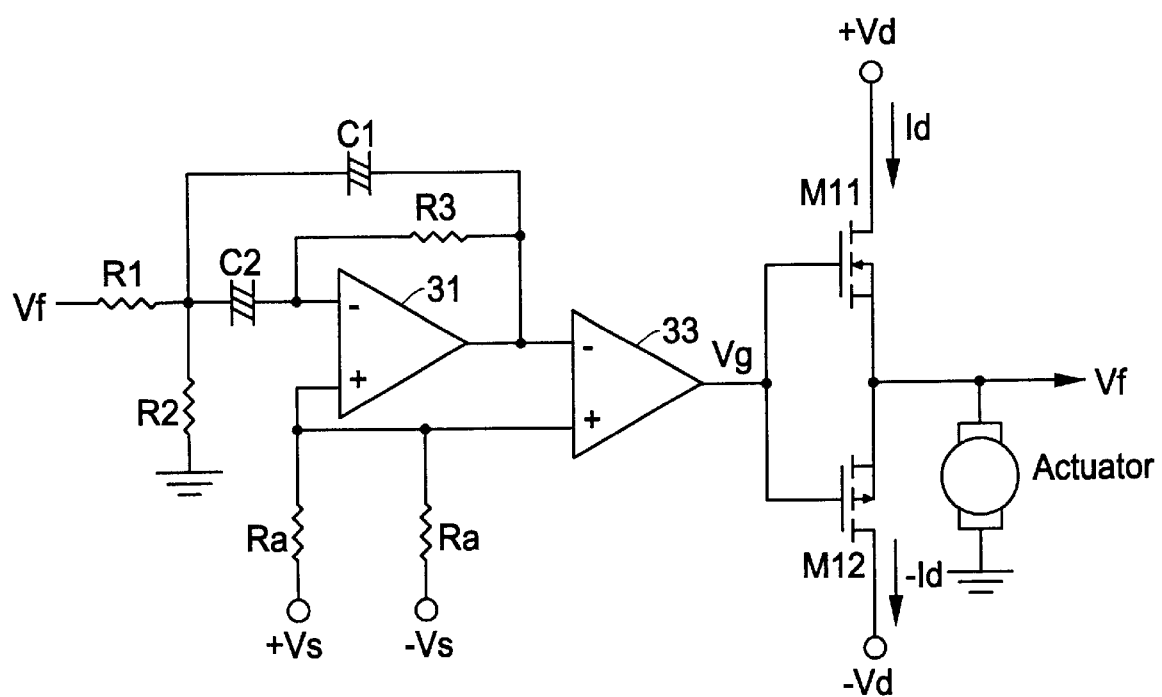
FIG. 9 is a circuit diagram showing an example of structure in the self-oscillation circuit for driving a linear oscillatory actuator with a push-pull circuit and one bias voltage configuration in the present invention.

FIG. 9 shows a further embodiment of the present invention in which the self-oscillation circuit for driving a linear oscillatory actuator is configured with a push-pull switch circuit. The bandpass filter is the same as that shown in the foregoing embodiments of FIGS. 6 and 7. In this example, a single comparator (operational amplifier) 33 is connected to the bandpass filter. The output of the comparator 33 is connected to the push-pull circuit.

The operational amplifier 31 of the bandpass filter and the comparator 33 are commonly biased with about zero voltage. Although not shown, the operational amplifier 31 and the comparator 33 are provided with power sources +Vs and −Vs. Thus, the comparator 33 produces a drive pulse Vg of a positive voltage at one half cycle and a negative voltage at another half cycle of the resonant frequency. Since the threshold voltage of the comparator 33 is zero voltage as noted above, the drive pulse Vg is a rectangular waveform of 50—50 duty ratio.

The push-pull circuit is configured with MOSFETs M11 and M22 as switch elements, although other types of semiconductor switches are also feasible. In this example, the MOSFET M11 is an n-type MOSFET and the MOSFET M22 is a p-type MOSFET connected in series. Positive and negative power sources +Vd and −Vd are respectively supplied to the push-pull circuit in the manner shown in FIG. 9. The actuator is connected between the common source of the MOSFET M11 and M22 and the ground. A feedback voltage Vf representing the back electromotive force voltage (Vbemf) detected at the actuator winding is provided to the input of the bandpass filter to establish a positive feedback loop.

In this configuration, when the drive pulse Vg is a positive pulse in the first half cycle, the MOSFET M11 is switched ON so that a supply current Id flows from the power source Vd, the MOSFET M11, the actuator, and to the ground. Conversely, when the drive pulse Vg is a negative pulse in the second half cycle, the MOSFET M22 is switched ON so that a supply current −Id flows from the ground, the actuator, the MOSFET M22, and to the power source −Vd. Consequently, the self-oscillation circuit of the present invention drives the actuator by two drive pulses to that electric current flows in the two directions (double sided drive) for each cycle of the resonant frequency.

Figure 10A:
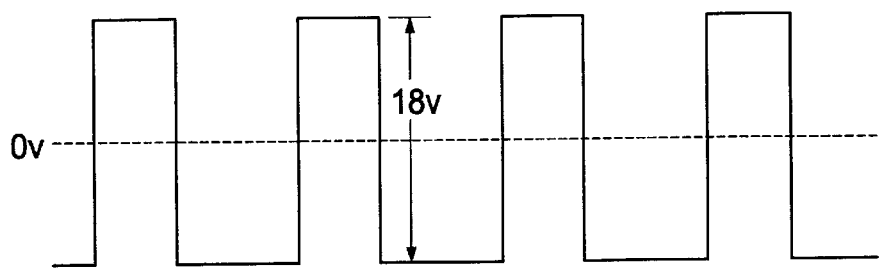
FIGS. 10A–10E are waveform charts illustrating rectangular drive pulses, feedback voltage representing Vbemf, supply currents from plus and minus power sources, and displacement of the actuator involved in the operation of the embodiment of FIG. 9.
Figure 10B:
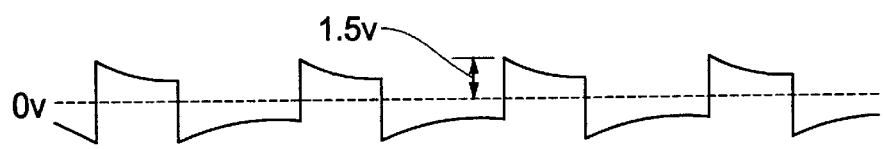
Figure 10C:
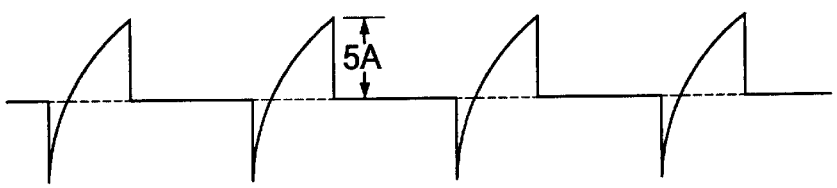
Figure 10D:
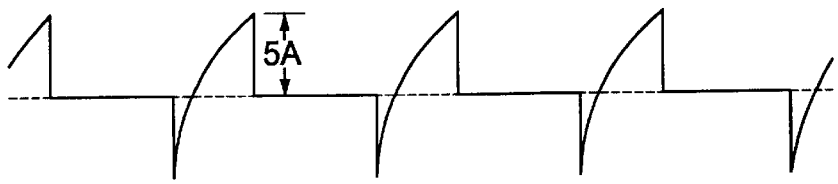
Figure 10E:
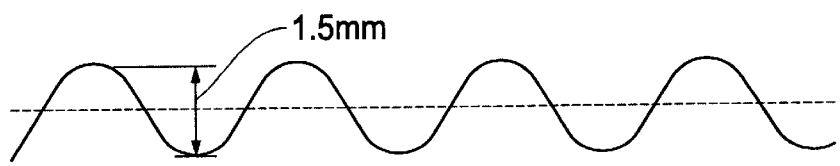

The waveform charts of FIGS. 10A–10E illustrate the rectangular drive pulses Vg, the feedback voltage Vf, supply currents from power sources +Vd and −Vd, and displacement of the actuator in the operation of the embodiment of FIG. 9. FIG. 10A shows a waveform of the drive pulse Vg which alternately swings in the positive direction in the first half cycle and in the negative direction in the second half cycle. FIG. 10B shows a waveform of the feedback voltage Vf representing the back electromotive force voltage (Vbemf) induced across the actuator winding. FIG. 10C shows a waveform of the supply current Id flowing from the power source +Vd to the actuator. FIG. 10D shows a waveform of the supply current −Id flowing from the actuator to the power source −Vd. FIG. 10E shows a waveform of the displacement of the actuator (reciprocator) which is in the mechanical resonant frequency of the actuator.

Figure 11:
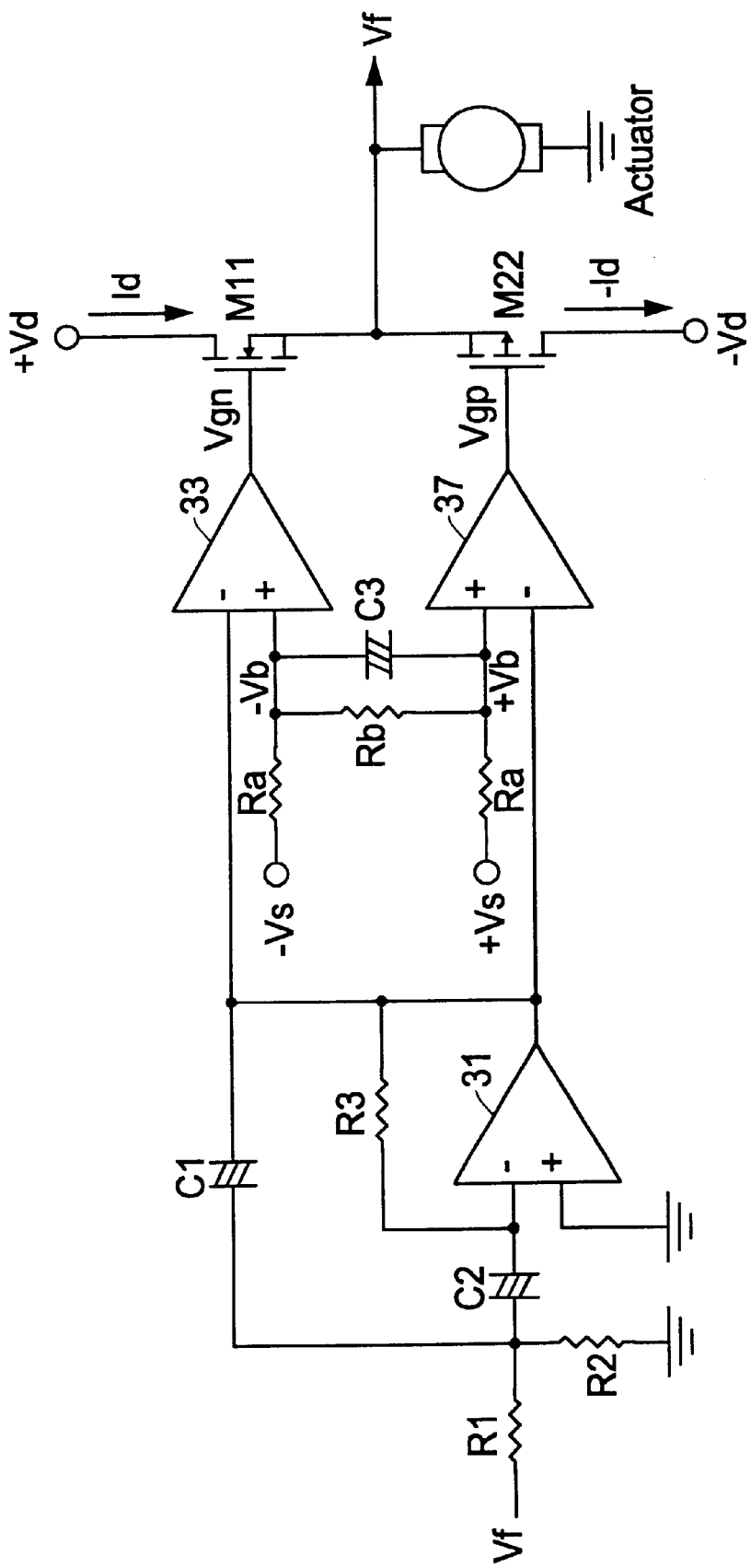
FIG. 11 is a circuit diagram showing an example of structure in the self-oscillation circuit for driving a linear oscillatory actuator with a push-pull circuit, two comparators, and two bias voltage configuration in the present invention.

Another preferred embodiment is shown in FIG. 11 which is a self-oscillation circuit for driving a linear oscillatory actuator with the push-pull circuit similar to the embodiment of FIG. 9. The example of FIG. 11 includes two comparators 33 and 37 and two threshold voltages +Vb and −Vb. The bias voltage (threshold voltage) −Vb is provided to the comparator 33 and the bias voltage (threshold voltage) +Vb is provided to the comparator 37. The output of the bandpass filter (operational amplifier 31) is commonly connected to the inputs of the comparators 33 and 37. The comparator 33 produces a drive pulse Vgn which is supplied to the gate of the n-type MOSFET M11. The comparator 37 produces a drive pulse Vgp which is supplied to the gate of the p-type MOSFET M11.

In this configuration, when the drive pulse Vgn is a positive pulse, the MOSFET M11 is switched ON so that a supply current Id flows from the power source Vd, the MOSFET M11, the actuator, and to the ground. Conversely, when the drive pulse Vgp is a negative pulse, the MOSFET M22 is switched ON so that a supply current −Id flows from the ground, the actuator, the MOSFET M22, and to the power source −Vd. Consequently, the self-oscillation circuit of FIG. 11 drives the actuator by two drive pulses so that electric current flows through the actuator in positive and negative directions (double sided drive) for each cycle of the resonant frequency.

The operational amplifier 31 of the bandpass filter is biased with zero voltage, i.e, ground potential. As noted above, the threshold voltage −Vb is provided to the comparator 33 and the threshold voltage +Vb is provided to the comparator 37. Thus, depending on the degree of voltage difference between the threshold voltage ±Vb and the ground potential, the duty ratio in the drive pulses Vgn and Vgp will be adjusted to smaller than 50—50, for example 40—40. This adjustment can be made by changing the resistance Ra and/or Rb. Preferably, the duty ratio is adjusted by changing the threshold voltages +Vb for optimum performance of the self-oscillation circuit.

Similar to the embodiment of FIG. 7 described above, the example of FIG. 11 further includes a resistor network (voltage divider) formed of resistors Ra and Rb where capacitor C3 is connected across the resistor Rb. The voltage divider determines the bias voltages −Vb and +Vb. The purpose of this arrangement is to facilitate a start-up operation in the self-oscillation circuit for driving the actuator. At the start-up of the self-oscillation circuit, it is necessary that the comparators 33 and 37 is able to produce the drive pulses even when an output voltage of the bandpass filter, i.e., feedback voltage Vf (i.e., back electromotive force voltage (Vbemf)) is small. To facilitate such a start-up operation, the capacitor C3 is provided to instantaneously short circuit the resistor Rb, at power on, so that the two bias voltages −Vb and +Vb become the zero voltage, thereby increasing the voltage sensitivity of the comparators 33 and 37.

Figure 12A:
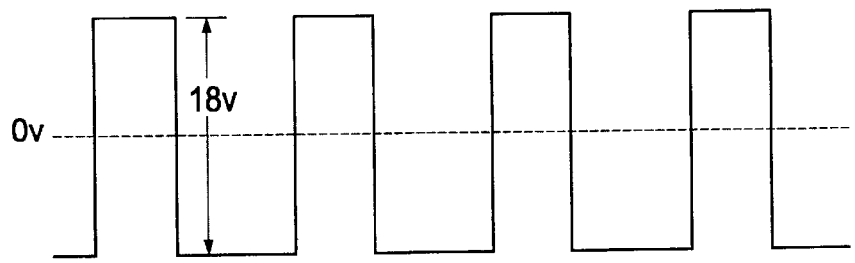
FIGS. 12A–12E are waveform charts illustrating rectangular drive pulses, feedback voltage representing Vbemf, supply currents from power sources, and displacement of the actuator involved in the operation of the embodiment of FIG. 11.

The waveform charts of FIGS. 12A–12E illustrate the rectangular drive pulses Vg, the feedback voltage Vf, supply currents from power sources +Vd and −Vd, and displacement of the actuator in the operation of the embodiment of FIG. 11. FIG. 12A shows a waveform of the drive pulse Vgn from the comparator 33. The waveform of FIG. 12A alternately swings in the positive polarity in the first half cycle and in the negative polarity in the second half cycle. Because of the threshold voltage −Vb, the pulse width in the positive side is smaller than the pulse width in the negative side, and only the positive side is used for driving the MOSFET M11. Although not shown here, a waveform of the drive pulse Vgp from the comparator 37 has a waveform opposite to that of Vgn and is phase shifted by 180°, and only the negative side is used for driving the MOSFET M22.

Figure 12B:
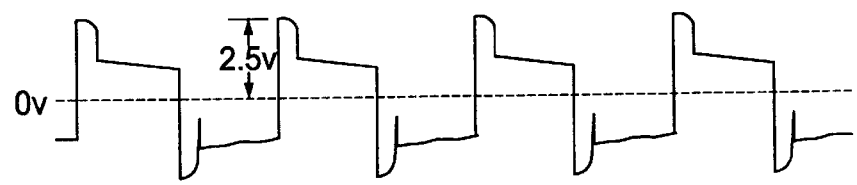
Figure 12C:
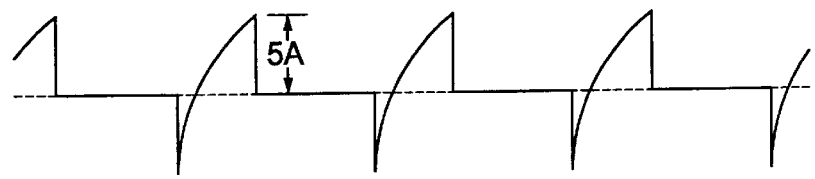
Figure 12D:
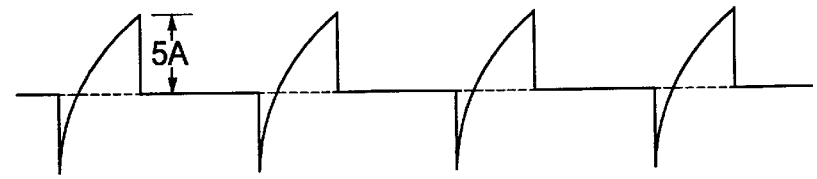
Figure 12E:
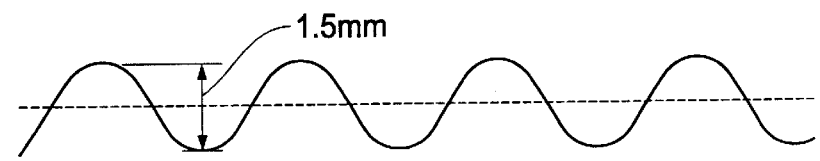

FIG. 12B shows a waveform of the feedback voltage Vf representing the back electromotive force voltage (Vbemf) induced across the actuator winding. FIG. 12C shows a waveform of the supply current Id flowing from the power source +Vd to the actuator. FIG. 12D shows a waveform of the supply current −Id flowing from the actuator to the power source −Vd. FIG. 12E shows a waveform of the displacement of the actuator (reciprocator) which is in the mechanical resonant frequency of the actuator.

With respect to the foregoing embodiments of the present invention, the inventor has discovered that a timing relationship between the drive pulses and movements of the actuator significantly affects the efficiency in driving the actuator. Thus, it is preferable to adjust the phase of the drive pulse for achieving the maximum efficiency, i.e., the maximum oscillation amplitude of the actuator with minimum power consumption (supply current).

Figure 13A:
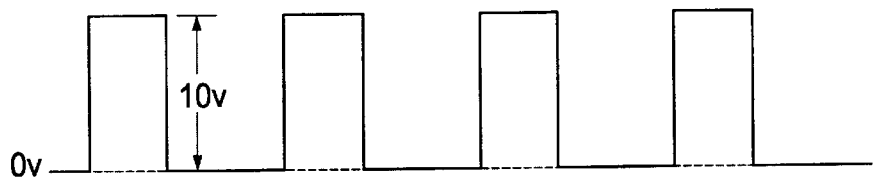
FIGS. 13A–13D are waveform charts illustrating a timing relationship between drive voltages and oscillation waveform of the actuator when the phase of the drive pulses is in a non-optimum setting.
Figure 13B:
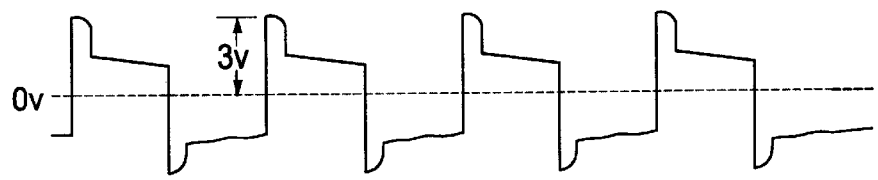
Figure 13C:
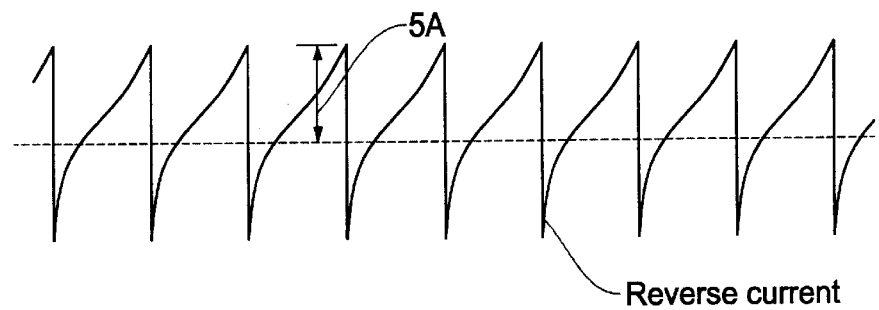
Figure 13D:
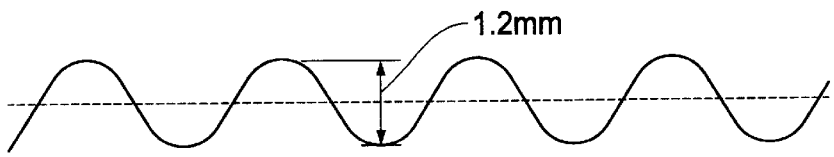

FIGS. 13A–13D show such a case where the timing relationship is inadequately set. FIG. 13A shows a waveform of the drive pulse Vo1 such as shown in FIG. 7. FIG. 13B shows a waveform of the feedback voltage Vf representing the back electromotive force voltage (Vbemf) induced across the actuator winding. FIG. 13C shows a waveform of the supply current Id flowing from the power source Vd to the actuator. FIG. 13D is a waveform showing the displacement of the actuator (reciprocator) which is in the mechanical resonant frequency of the actuator. In this example, the peak-to-peak amplitude of the displacement is about 1.2 millimeters.

Figure 14A:
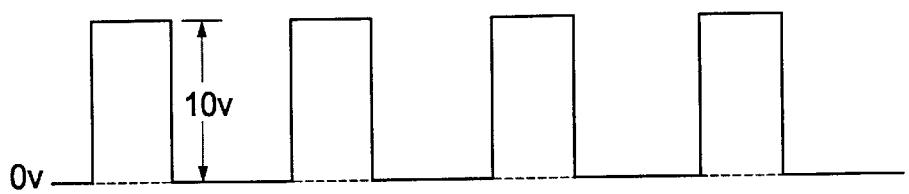
FIGS. 14A–14D are waveform charts illustrating a timing relationship between drive voltages and oscillation waveform of the actuator when the phase of the drive pulses is in an optimum setting.
Figure 14B:
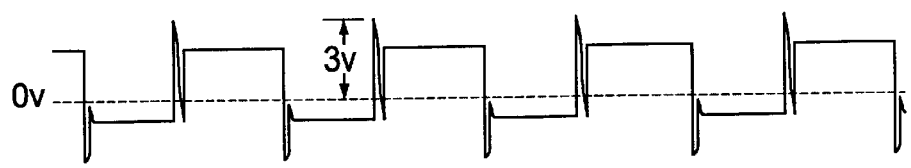
Figure 14C:
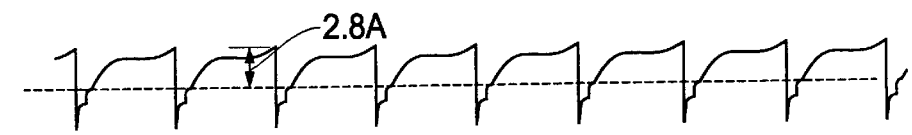
Figure 14D:
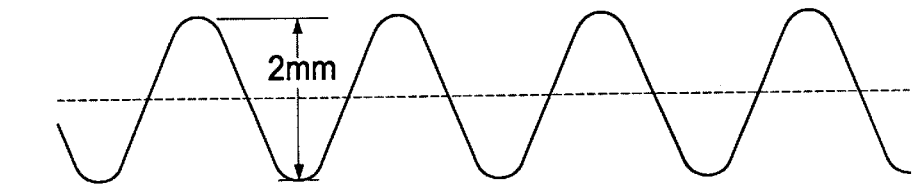

FIGS. 14A–14D are waveform charts corresponding to FIG. 13A–13D in the case where the timing relationship is adequately set for the maximum efficiency. As shown in FIG. 14D, the peak-to-peak amplitude of the actuator displacement is about 2.0 millimeters. Note that the phase difference between the drive pulse Vo1 of FIG. 14A and the actuator displacement of FIG. 14D is different from the phase difference between the drive pulse Vo1 of FIG. 13A and the actuator displacement of FIG. 13D. Also note that the supply current Id (representing power consumption) of FIG. 14C has a significantly smaller average value than that shown in FIG. 13C. FIG. 14B shows a waveform of the feedback voltage Vf.

As noted above, this maximum efficiency of FIGS. 14A–14D is achieved by adjusting the timing (phase) of the drive pulses Vo1 and Vo2, i.e., the sine wave applied to the comparators 33 and 37. There are various ways of adjusting the phase, for example, by changing the resistance R3 in the bandpass filter or by inserting a delay circuit either input or output of the bandpass filter. It is also possible to adjust the phase of the drive pulse (start and end timings of the drive pulse) by changing the threshold voltage of the comparators 33 and 38, i.e., regulating the duty ratio of the drive pulses.

In the embodiments of FIGS. 7 and 11 in the foregoing, the threshold voltages for the comparators 33 and 37 are different from the bias voltage of the output sine wave of the bandpass filter, thereby creating the duty ratio smaller than 50—50 such as 40—40. When the duty ratio is smaller than 50—50, there is a time period in which none of the switches (MOSFETs) are activated by the drive pulses. The present invention is to make use of such an OFF period of the MOSFETs for discharging the magnetic energy stored in the inductor of the winding during the flow of forward current by the flow of reverse current.

The reverse current is a portion of the supply current Id flowing in a reverse direction as indicated in FIGS. 8C and 13C. The energy stored in the winding of the actuator by the forward flow of supply current is discharged as the reverse current after the forward flow is turned off. In the present invention, this discharge process is performed during the time period when all of the switches (MOSFETs) are OFF.

Figure 15C:
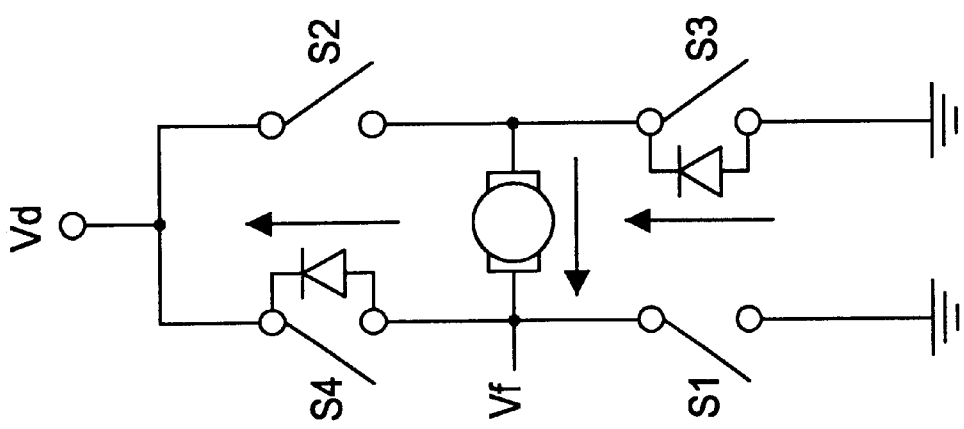
FIGS. 15A–15C are schematic diagram showing a process of charging and discharging the reverse current involved in the H-bridge circuit of the present invention.
Figure 15B:
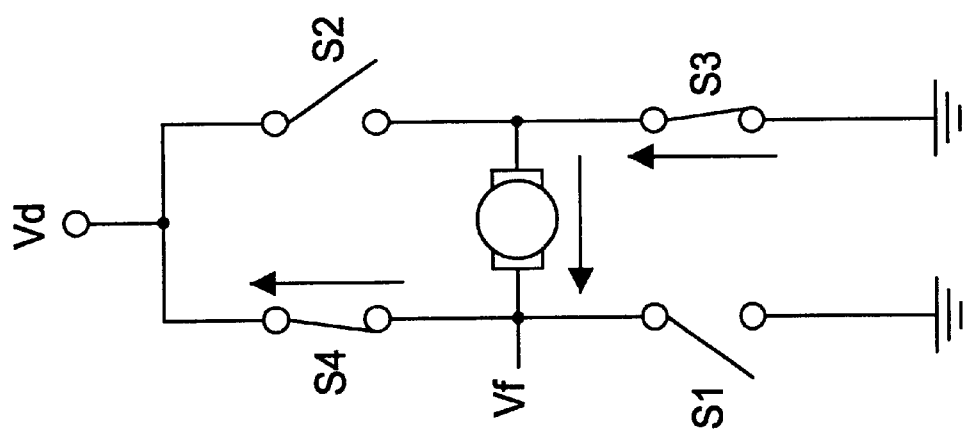
Figure 15A:
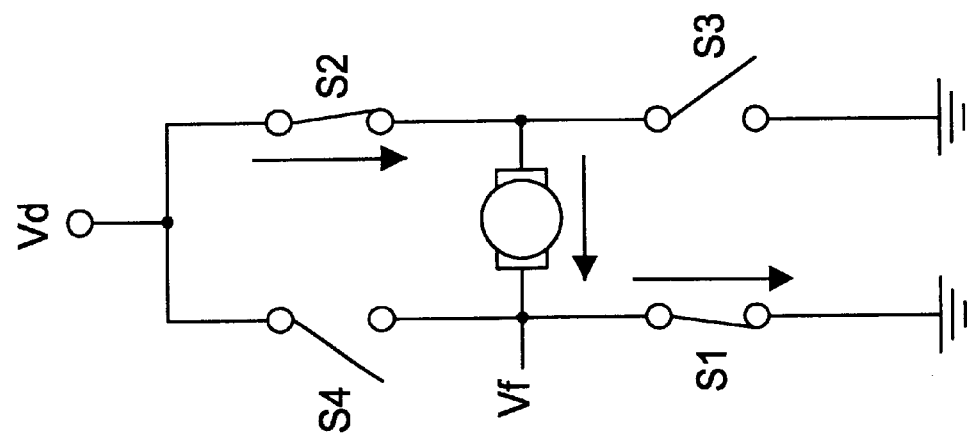

FIGS. 15A–15C show this process in which labels S1–S4 denote the switches such as implemented by MOSFETs M1–M4 in the H-bridge configuration. When the drive pulse Vo1 is applied to the H-bridge, the switches S1 and S2 are ON so that the supply current Id flows through the pass indicated by the arrows shown in FIG. 15A. Conversely, when the drive pulse Vo2 is applied to the H-bridge, the switches S3 and S4 are ON so that the supply current Id flows through the pass indicated by the arrows shown in FIG. 15B. Since the switches are ON in either situations of FIGS. 15A and 15B, the time constant involving the winding is large, the energy stored in the winding cannot efficiently be discharged. In FIG. 15C, which shows a situation where all of the switches are OFF during the time period noted above, the stored energy is quickly discharged by a discharge current $I_R$ through, for example internal diodes of the MOSFETS.

As has been described above, according to the present invention, the self-oscillation circuit generates the drive pulse two times per cycle of the mechanical resonance frequency. This method requires a substantially smaller amount of power for driving the actuator than that required in the conventional technology. Further, the self-oscillation circuit is able to achieve quick response to external loads, because the repetition rate of the drive pulse is two times higher than that of the single sided drive method.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A self-oscillation circuit for driving an oscillatory actuator which has a winding to receive a periodical supply current from a power source and oscillates in a predetermined resonant frequency, comprising:

a bandpass filter whose center frequency is adjusted to the resonant frequency for receiving a back electromotive force voltage (Vbemf) developed across the winding in the actuator and producing a sine wave output signal representing the Vbemf; and a power amplifier for receiving the sine wave output signal from the bandpass filter and producing two drive pulses in each cycle of the resonant frequency of the actuator to cause the periodical supply current flowing through the winding in positive and negative directions in each cycle of the resonant frequency.

2. A self-oscillation circuit as defined in claim 1, wherein the power amplifier is comprised of:

a comparator for comparing the sine wave output signal from the bandpass filter with a threshold voltage and producing the drive pulse when the sine wave exceeds the threshold voltage; and a switch connected in series with the winding to connect or disconnect the power source to the winding in response to the drive pulse, thereby causing the periodic supply current flowing in the positive and negative directions through the winding.

3. A self-oscillation circuit as defined in claim 2, wherein the threshold voltage of the comparator is the same as a bias voltage of the bandpass filter.

4. A self-oscillation circuit as defined in claim 2, wherein the threshold voltage of the comparator is different from a bias voltage of the bandpass filter.

5. A self-oscillation circuit for driving an oscillatory actuator which has a winding to receive a periodical supply current from a power source and oscillates in a predetermined resonant frequency, comprising:

a bandpass filter whose center frequency is adjusted to the resonant frequency for receiving a back electromotive force voltage (Vbemf) developed across the winding in the actuator and producing a sine wave output signal representing the Vbemf;

a first comparator for comparing the sine wave output signal from the bandpass filter with a threshold voltage and producing a first drive pulse when the sine wave exceeds the threshold voltage in a first half cycle of the resonant frequency;

a second comparator for comparing a sine wave, which is inverted in polarity from the sine wave output signal from the bandpass filter, with the threshold voltage and producing a second drive pulse when the sine wave exceeds the threshold voltage in a second half cycle of the resonant frequency; and an H-bridge switch circuit having four switches with the actuator connected in a middle portion thereof and connected to the power source, wherein the H-bridge switch circuit connects or disconnects the power source to the winding in response to the first and second drive pulses, thereby causing the periodic supply current flowing in positive and negative directions through the winding at each cycle of the resonant frequency.

6. A self-oscillation circuit as defined in claim 5, wherein the threshold voltage of the first and second comparators is the same as a bias voltage of the bandpass filter.

7. A self-oscillation circuit as defined in claim 5, wherein the threshold voltage of the first and second comparators is different from a bias voltage of the bandpass filter.

8. A self-oscillation circuit as defined in claim 7, further including means for instantaneously changing the threshold voltage of the first and second comparators to be the same as or similar to the bias voltage of the bandpass filter during a predetermined period of time at a start-up process of oscillation of the actuator.

9. A self-oscillation circuit as defined in claim 8, wherein the means for instantaneously changing the threshold voltage is configured with a capacitor connected across a resistor forming a voltage divider.

10. A self-oscillation circuit as defined in claim 5, wherein the four switches are comprised of first to fourth metal oxide semiconductor field effect transistors (MOSFET) wherein the first and second MOSFETs receive the first drive pulse at the gates thereof and the third and fourth MOSFETs receive the second drive pulse at the gates thereof.

11. A self-oscillation circuit as defined in claim 5, further including an inverter for inverting the sine wave output signal from the bandpass filter and supplying the inverted sine wave to the second comparator.

12. A self-oscillation circuit for driving an oscillatory actuator which has a winding to receive a periodical supply current from a power source and oscillates in a predetermined resonant frequency, comprising:

a bandpass filter whose center frequency is adjusted to the resonant frequency for receiving a back electromotive force voltage (Vbemf) developed across the winding in the actuator and producing a sine wave output signal representing the Vbemf;

a comparator for comparing the sine wave output signal from the bandpass filter with a threshold voltage and producing a drive pulse with a positive voltage swing in a first half cycle of the resonant frequency and with a negative voltage swing in a second half cycle of the resonant frequency produced every time when the sine wave crossing the threshold voltage; and a push-pull switch circuit having two switches with the actuator connected in a middle portion thereof to a ground and connected to positive and negative power sources, wherein the push-pull switch circuit connects or disconnects the positive and negative power sources to the winding in response to the drive pulse, thereby causing the periodic supply current flowing in positive and negative directions through the winding at each cycle of the resonant frequency.

13. A self-oscillation circuit as defined in claim 12, wherein the two switches are comprised of first and second metal oxide semiconductor field effect transistors (MOSFET) connected in series and provided with the positive power source at the first MOSFET and the negative power source at the second MOSFET.

14. A self-oscillation circuit as defined in claim 12, wherein the two switches are comprised of first and second metal oxide semiconductor field effect transistors (MOSFET) connected in series wherein the first MOSFET is an n-type MOSFET and the second MOSFET is a p-type MOSFET both of which receive the drive pulse from the comparator.

15. A self-oscillation circuit for driving an oscillatory actuator which has a winding to receive a periodical supply current from a power source and oscillates in a predetermined resonant frequency, comprising:

a bandpass filter whose center frequency is adjusted to the resonant frequency for receiving a back electromotive force voltage (Vbemf) developed across the winding in the actuator and producing a sine wave output signal representing the Vbemf;

a first comparator for comparing the sine wave output signal from the bandpass filter with a first threshold voltage and producing a first drive pulse when the sine wave exceeds the first threshold voltage in a first half cycle of the resonant frequency;

a second comparator for comparing the sine wave output signal from the bandpass filter with a second threshold voltage and producing a second drive pulse when the sine wave exceeds the second threshold voltage in a second half cycle of the resonant frequency; and a push-pull switch circuit having two switches with the actuator connected in a middle portion thereof to a ground and connected to positive and negative power sources, wherein the push-pull switch circuit connects or disconnects the positive and negative power sources to the winding in response to the first and second drive pulses, thereby causing the periodic supply current flowing through the winding in positive and negative directions at each cycle of the resonant frequency.

16. A self-oscillation circuit as defined in claim 15, wherein the first threshold voltage for the first comparator and the second threshold voltage for the second comparator are the same as a bias voltage of the bandpass filter.

17. A self-oscillation circuit as defined in claim 15, wherein the first threshold voltage for the first comparator and the second threshold voltage for the second comparator are different from a bias voltage of the bandpass filter.

18. A self-oscillation circuit as defined in claim 15, further including means for instantaneously changing the threshold voltage of the first and second comparators to be the same as or similar to the bias voltage of the bandpass filter during a predetermined period of time at a start-up process of oscillation of the actuator.

19. A self-oscillation circuit as defined in claim 15, wherein the means for instantaneously changing the threshold voltage is configured with a capacitor connected across a resistor forming a voltage divider.

20. A self-oscillation circuit as defined in claim 15, wherein the two switches are comprised of first and second metal oxide semiconductor field effect transistors (MOSFET) connected in series wherein the first MOSFET is an n-type MOSFET which receives the first drive pulse from the first comparator and the second MOSFET is a p-type MOSFET which receives the second drive pulse from the second comparator.

* * * * *